United States Patent
Matoba et al.

(10) Patent No.: US 10,801,423 B2
(45) Date of Patent: *Oct. 13, 2020

(54) SUPERCHARGING DEVICE FOR ENGINE

(71) Applicant: Mazda Motor Corporation, Aki-gun, Hiroshima (JP)

(72) Inventors: Yasunori Matoba, Hiroshima (JP); Hiroyuki Morioka, Higashihiroshima (JP); Takayoshi Miyachi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/280,257

(22) Filed: Feb. 20, 2019

(65) Prior Publication Data
US 2019/0277207 A1 Sep. 12, 2019

(30) Foreign Application Priority Data
Mar. 7, 2018 (JP) .................................. 2018-040407

(51) Int. Cl.
*F02D 23/00* (2006.01)
*F02B 33/40* (2006.01)
*F02B 37/12* (2006.01)
*F02D 21/08* (2006.01)
*F02B 39/12* (2006.01)
(Continued)

(52) U.S. Cl.
CPC ............ *F02D 23/005* (2013.01); *F02B 33/38* (2013.01); *F02B 33/40* (2013.01); *F02B 37/12* (2013.01); *F02B 39/12* (2013.01); *F02D 21/08* (2013.01); *F02D 41/0007* (2013.01); *F02B 37/162* (2019.05); *F02B 2039/164* (2013.01);
(Continued)

(58) Field of Classification Search
CPC .......... F02B 33/34; F02B 33/38; F02B 33/40; F02B 37/12; F02B 39/12; F02B 2039/164; F02B 2039/168; F02B 37/162; F02D 21/08; F02D 23/005; F02D 41/0007; F02D 2200/021; F02D 41/064
See application file for complete search history.

(56) References Cited

U.S. PATENT DOCUMENTS

2016/0061104 A1* 3/2016 Hirayama ............... F02D 41/12
60/602
2018/0202349 A1* 7/2018 Kindl .................. F02D 41/0007

FOREIGN PATENT DOCUMENTS

JP 2015129457 A 7/2015
JP 6281504 B2 2/2018

* cited by examiner

*Primary Examiner* — Brandon D Lee
(74) *Attorney, Agent, or Firm* — Alleman Hall Creasman & Tuttle LLP

(57) ABSTRACT

A supercharging device for an engine is provided, which includes a supercharger provided to an intake passage of the engine, an actuator configured to drive the supercharger, and a controller including a processor configured to control the actuator to drive the supercharger when an operating state of the engine is in a given supercharging range, and to stop the supercharger when the operating state is in a non-supercharging range. The controller causes the actuator to forcibly drive the supercharger in the non-supercharging range when a temperature of the supercharger is lower than a preset temperature, and prohibits the forcible drive of the supercharger when a rotation speed of the supercharger during the forcible drive of the supercharger is lower than a preset rotation speed.

5 Claims, 10 Drawing Sheets

(51) Int. Cl.
  *F02D 41/00* (2006.01)
  *F02B 33/38* (2006.01)
  *F02D 41/06* (2006.01)
  *F02B 39/16* (2006.01)
  *F02B 37/16* (2006.01)
(52) U.S. Cl.
  CPC ...... *F02B 2039/168* (2013.01); *F02D 41/064* (2013.01); *F02D 2200/021* (2013.01)

SUPERCHARGING DEVICE FOR ENGINE

TECHNICAL FIELD

The present disclosure relates to a supercharging device for an engine, particularly to the supercharging device which drives a supercharger when an operating state of the engine is in a given supercharging range.

BACKGROUND OF THE DISCLOSURE

Conventionally, engines with a supercharger in which a part of an intake passage upstream of the supercharger is connected with a part downstream of an intercooler through a bypass passage to bypass the supercharger, are known. Normally, the engines with the supercharger are controlled so that the supercharger is driven when an operating state is in a given supercharging range (e.g., a high engine speed or high load range), and is stopped when the operating state is in a non-supercharging range other than the supercharging range.

Moreover, it is also known that, in order to improve the exhaust emission capability, exhaust gas recirculation (EGR) gas containing nitrogen oxide and blowby gas containing unburned hydrocarbon are recirculated to a part of the intake passage upstream of the supercharger. When the EGR gas, etc. is recirculated to the intake passage and the temperature in the intake passage is lower than a dew point, moisture (steam) contained in the EGR gas, etc. may condense to generate condensate. The generated condensate may cause corrosion of metal parts, etc. which constitute the intake passage. Therefore, technologies for removing the condensate generated in the intake passage have been proposed.

For example, JP2015-129457A discloses a control device for an internal combustion engine which includes a supercharger comprised of a turbine and a compressor, an EGR device which recirculates a portion of exhaust gas to an intake passage through an EGR passage which connects a part of an exhaust passage downstream of a turbine to a part of the intake passage upstream of a compressor, a bypass passage which connects a part of the intake passage downstream of the compressor to a part of the intake passage upstream of the compressor, an air bypass valve disposed in the bypass passage, and an intake temperature sensor provided to the intake passage. The control device is also provided with a mechanism to open the air bypass valve when the intake temperature is lower than the condensing temperature of the moisture. Thus, during a cold start, the control device causes the compressor to recirculate adiabatically-compressed air through the bypass passage to increase the intake temperature to accelerate evaporation (removal) of the condensate generated in the intake passage.

When intake air is introduced into the supercharger while the supercharger is at an extremely low temperature, moisture in the intake air and the condensate in the intake passage are frozen inside the supercharger, which may result in issues in the function of the supercharger. Particularly, for a mechanical supercharger in which a transmission belt is wound around a pulley coupled to an engine crankshaft and a pulley of the supercharger is driven by the engine crankshaft, if ice (an ice block) exists between rotors and a casing, the ice impedes (locks) rotation of the rotors, which may cause issues, such as burning or seizure of the transmission belt. Therefore, when the engine is started while the supercharger is at a low temperature, the supercharger is forcibly driven even if the operating state is in the non-supercharging range to increase the supercharger temperature (inner wall temperature) in a stage before the operating state enters the supercharging range. This results in avoidance of the freezing of the condensate inside the supercharger to secure the function of the supercharger.

However, when the inner wall temperature of the supercharger is lower than the dew point after an engine stop, the condensate which condensed on the inner wall of the supercharger may already have been frozen inside the supercharger. In such a situation where the condensate inside the supercharger has already been frozen, when executing the forcible drive for increasing the temperature of the supercharger in the stage before the operating state enters the supercharging range as described above, the unmelted ice may again impede the rotor rotation when the engine is restarted because the temperature of the supercharger is still low. That is, in order to secure the function of the supercharger during the cold start, there is still room for further improvement.

SUMMARY OF THE DISCLOSURE

One purpose of the present disclosure is to provide a supercharging device for an engine which can secure the function of a supercharger during a cold start.

According to one aspect of the present disclosure, a supercharging device for an engine is provided, which includes a supercharger provided to an intake passage of the engine, an actuator configured to drive the supercharger, and a controller including a processor configured to control the actuator to drive the supercharger when an operating state of the engine is in a given supercharging range, and to stop the supercharger when the operating state of the engine is in a non-supercharging range, the controller causing the actuator to forcibly drive the supercharger in the non-supercharging range when a temperature of the supercharger is lower than a preset temperature, and prohibiting the forcible drive of the supercharger when a rotation speed of the supercharger during the forcible drive of the supercharger is lower than a preset rotation speed.

According to this configuration, since the controller forcibly drives the supercharger by the actuator in the non-supercharging range when the temperature associated with the supercharger is lower than the preset temperature, the temperature of the supercharger can be increased before the operating state enters the supercharging range, thereby avoiding freezing in the supercharger and securing a traveling performance expected of the supercharger.

Moreover, since the controller prohibits the forcible drive of the supercharger if the occurrence of freezing in the supercharger is determined based on the state of the supercharger while the supercharger is forcibly driven for the freezing determination, difficulties resulting from ice which already exists in the supercharger can be avoided.

The actuator may have an electromagnetic clutch configured to engage an output shaft of the engine with the supercharger. The controller may forcibly drive the supercharger by reducing a degree of engagement of the electromagnetic clutch when the temperature of the supercharger is lower than the preset temperature.

According to this configuration, difficulties resulting from the ice jam can be reduced even if the ice already exists in the supercharger.

The actuator may include an electromagnetic clutch configured to engage an output shaft of the engine with the supercharger, a bypass passage bypassing the supercharger, and a valve configured to open and close the bypass passage.

The controller may release the electromagnetic clutch and open the valve when the operating state is in the non-supercharging range, and forcibly drive the supercharger by closing the valve in the non-supercharging range when the supercharger temperature is lower than the preset temperature.

According to this configuration, since the controller opens the electromagnetic clutch and opens the valve when the engine operating state is in the non-supercharging range, intake air can be supplied while reducing a channel resistance when the operating state is in the non-supercharging range.

According to this configuration, since the controller forcibly drives the supercharger by closing the valve in the non-supercharging range when the temperature of the supercharger is lower than the preset temperature, the temperature of the supercharger can be increased before the engine operating state enters the supercharging range.

The controller may determine whether freezing of water inside the supercharger has occurred based on the rotation speed of the supercharger during the forcible drive of the supercharger.

According to this configuration, the ice which already exists in the supercharger can easily be determined.

The controller may engage the electromagnetic clutch and close the valve when forcibly driving the supercharger.

According to this configuration, the temperature of the supercharger can be quickly increased.

The controller may estimate an increasing amount and a decreasing amount of the temperature of the supercharger, and estimate the temperature of the supercharger based on a difference between the estimated increasing and decreasing amounts of the temperature.

The controller may estimate the increasing amount of the temperature based on at least one of an amount of intake air, an ambient temperature, the rotation speed of the supercharger, a pressure upstream of the supercharger, and a pressure downstream of the supercharger.

The controller may estimate the decreasing amount of the temperature based on a traveling speed of a vehicle.

According to this configuration, an inner wall temperature of the supercharger can easily be estimated.

DETAILED DESCRIPTION OF THE DISCLOSURE

Hereinafter, one form for implementing the present disclosure is described with reference to the accompanying drawings. Description of the following desirable embodiment is merely illustrative, and is not intended to limit the present disclosure, its applications, nor usage.

Figure 1:
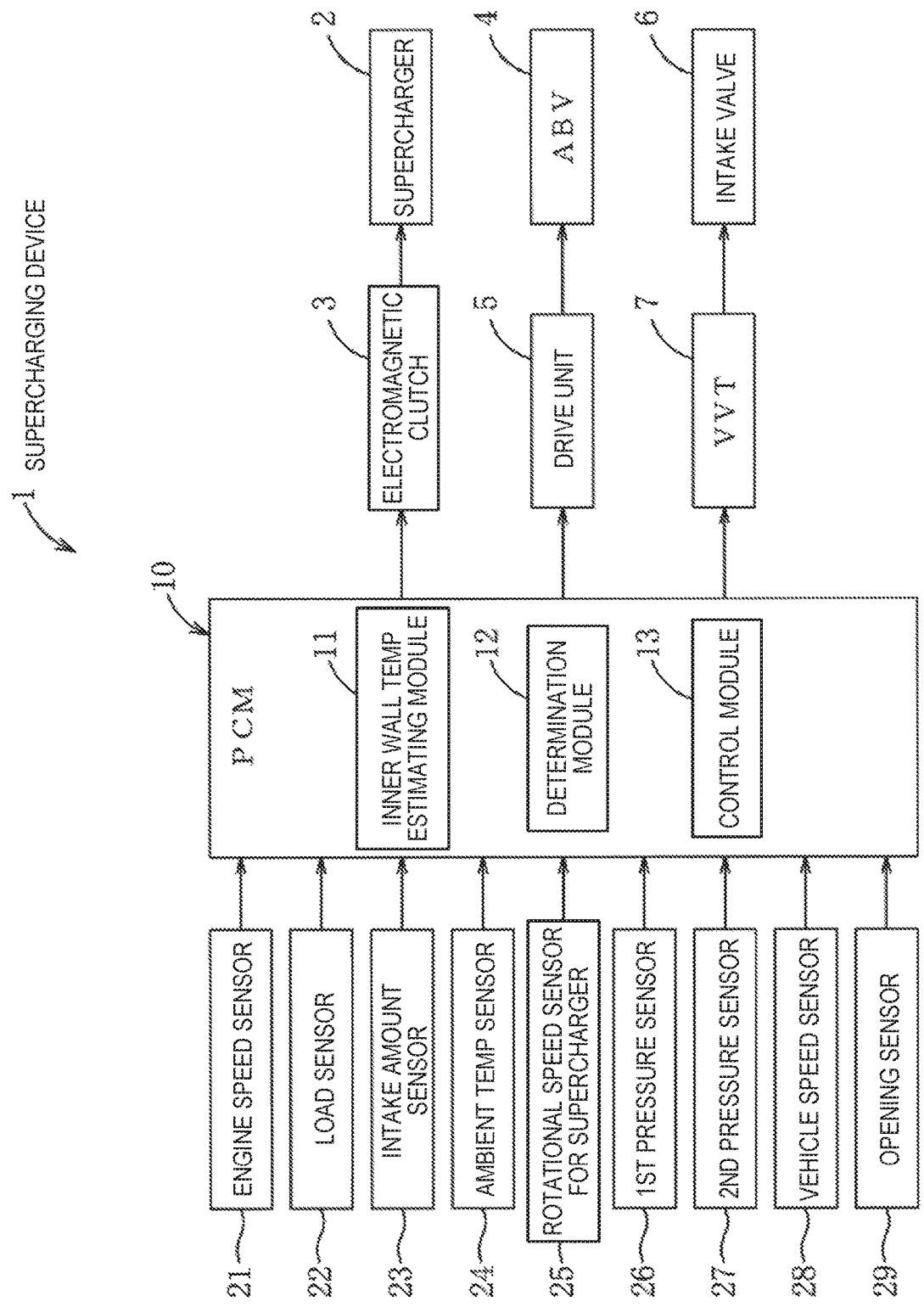
FIG. 1 is a diagram schematically illustrating a configuration of a supercharging device according to one embodiment of the present disclosure.

Below, one embodiment of the present disclosure is described based on FIGS. 1 to 9. As illustrated in FIG. 1, a supercharging device 1 of an engine of this embodiment mainly includes a supercharger 2, an electromagnetic clutch 3 which drives the supercharger 2, a bypass valve (hereinafter, abbreviated as "ABV") 4, a drive unit 5 which opens and closes the ABV 4, an intake valve 6 which opens and closes an intake port, a variable valve timing mechanism (hereinafter, abbreviated as "VVT") 7 which changes open and close timings of the intake valve, and a power train control module (hereinafter, abbreviated as "PCM") 10 (i.e., a controller).

The PCM 10 of the supercharging device 1 is electrically connected to various sensors such as an engine speed sensor 21, an engine load sensor 22, an intake amount sensor 23 which detects an amount of intake air introduced into the engine, an ambient temperature sensor 24, a rotational speed sensor 25 for the supercharger 2, a first pressure sensor 26 which detects a pressure upstream of the supercharger 2, a second pressure sensor 27 which detects a pressure downstream of the supercharger 2, a vehicle speed sensor 28, and an opening sensor 29 which detects an opening of a grille shutter (not illustrated) which adjusts an amount of air introduced into an engine room in a front part of the vehicle while the vehicle is traveling.

First, an outline configuration of the engine provided with the supercharging device 1 is described.

<Intake and Exhaust Systems of Engine>

Figure 2:
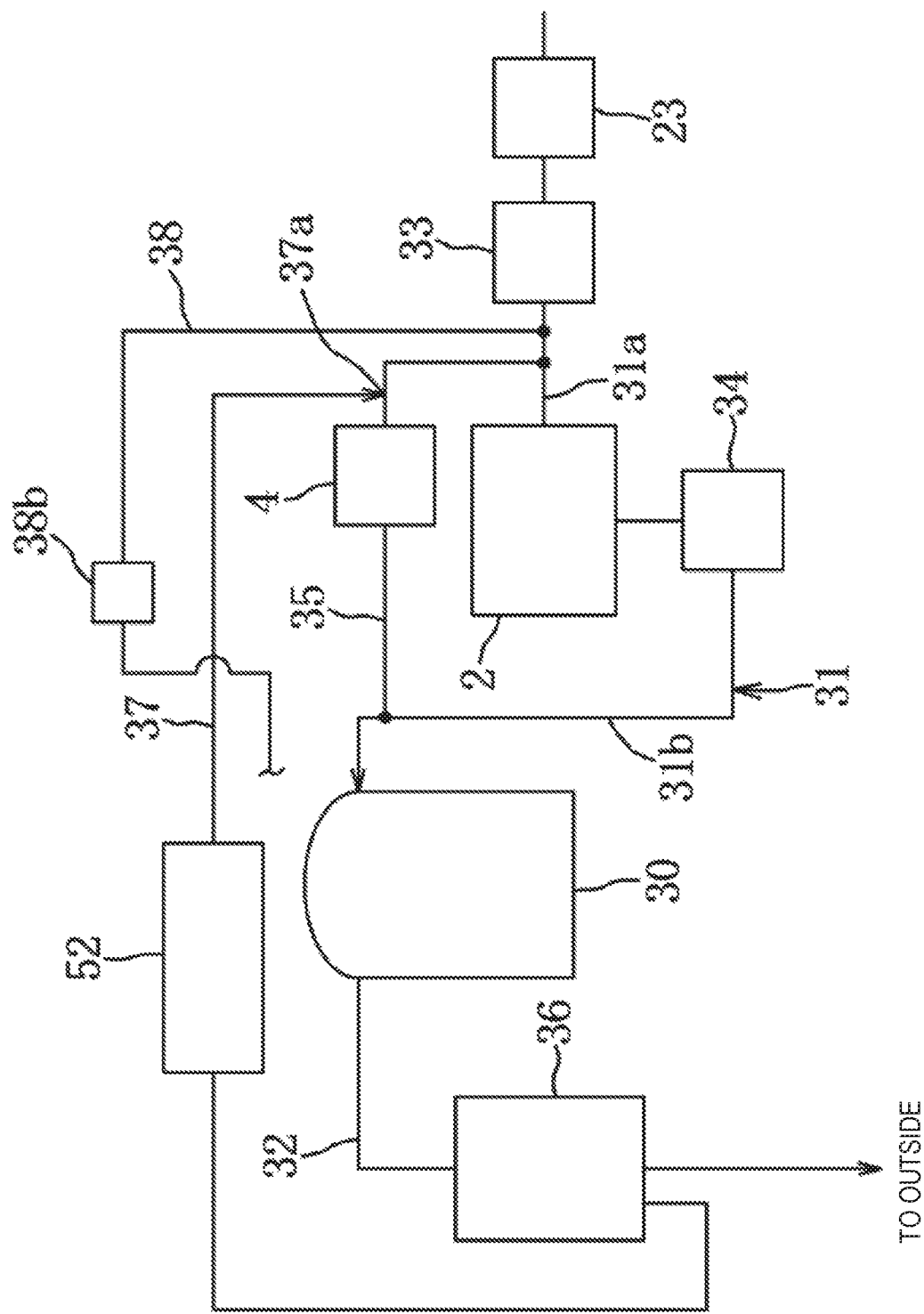
FIG. 2 is a block diagram illustrating intake and exhaust systems of an engine provided with the supercharging device.

As illustrated in FIG. 2, the intake and exhaust system of the engine is comprised of a cylinder 30 which forms an engine combustion chamber, an intake passage 31 through which intake air is introduced into the cylinder 30 via the intake valve 6, and an exhaust passage 32 which discharges exhaust gas from the cylinder 30 via an exhaust valve (not illustrated). The engine may be an in-series multi-cylinder engine with the supercharger for an automobile. In FIG. 2, only one cylinder 30 is illustrated.

In the intake passage 31, from upstream to downstream, the intake amount sensor 23 comprised of an airflow sensor, a throttle valve 33 which adjusts an amount of intake air, the supercharger 2 which compresses the intake air and supplies the compressed air to the cylinder 30, and an intercooler 34 which cools intake air discharged from the supercharger 2, are disposed in this order. The intake passage 31 is provided with a bypass passage 35 which bypasses the supercharger 2 and connects an intake passage part 31*a* (see FIG. 4) upstream of the supercharger 2 to an intake passage part 31*b* downstream of the supercharger 2. The ABV 4 which changes a passage cross-sectional area of the bypass passage 35 is provided at an intermediate location of the bypass passage 35.

The supercharger 2 is driven by a supercharger actuator when an operating state of the engine is in a given supercharging range, and is stopped when the engine operating state is in a non-supercharging range. Here, the supercharger 2 of this embodiment is assumed to be an internal compression type supercharger with a high demand of reducing the drive loss, for example, a Lysholm supercharger comprised of two rotors and a casing which accommodates these rotors, but may also be a blow-type, Roots type supercharger.

An emission control device 36 which purifies the exhaust gas is disposed in the exhaust passage 32. An exhaust gas recirculation (EGR) passage 37 is provided to recirculate a portion of the exhaust gas from a part of the exhaust passage 32 downstream of the emission control device 36 to the intake passage 31, as EGR gas. The EGR passage 37 is connected to a part of the bypass passage 35 upstream of the ABV 4.

Figure 4:
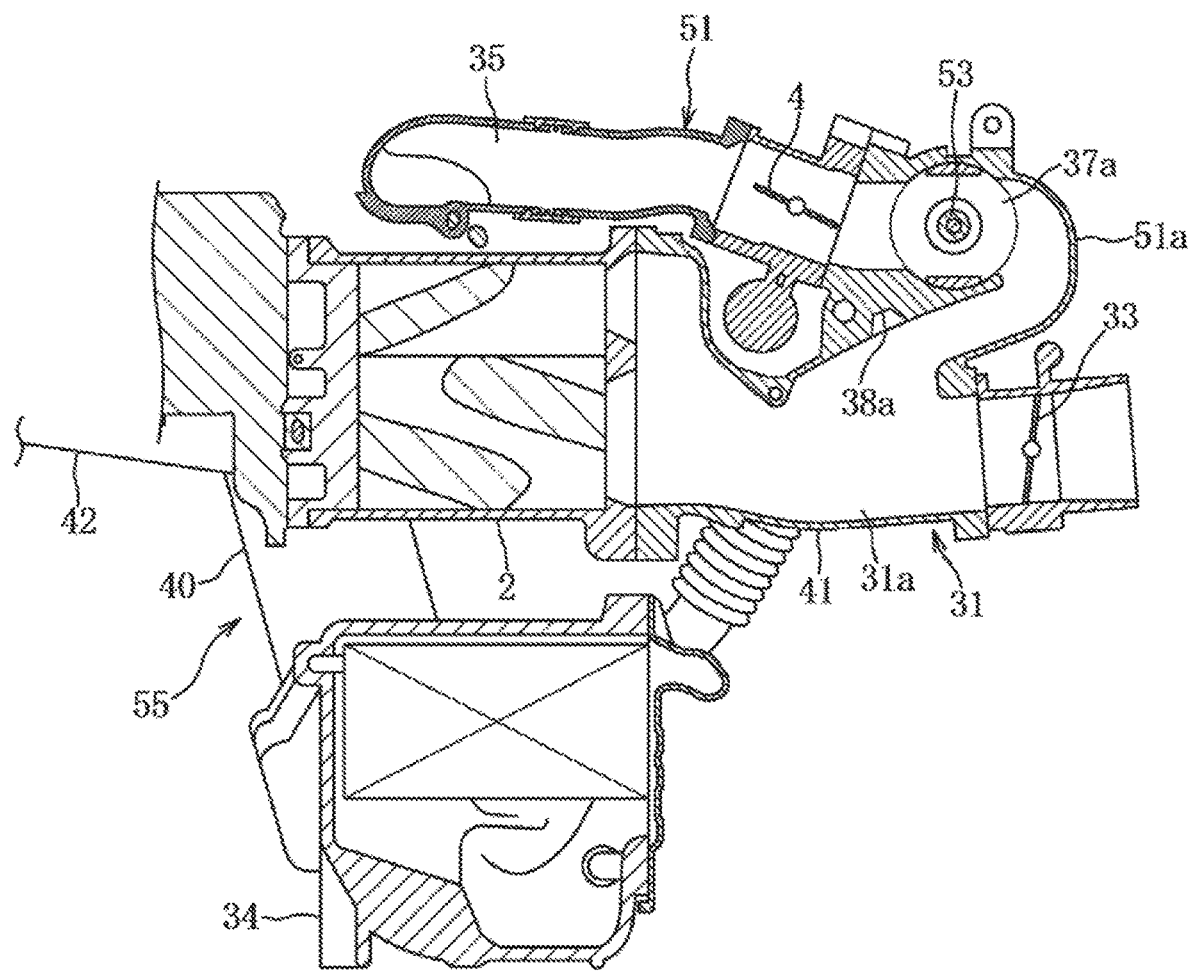
FIG. 4 is a vertical cross-section of the intake system of the engine.

As illustrated in FIG. 4, in this embodiment, the bypass passage 35 is branched upwardly from a part of the intake passage upstream of the supercharger 2, and extends above the supercharger 2. An EGR gas introduction part 37a to the intake passage 31 by the EGR passage 37 is provided to a part of the bypass passage 35 extending above the supercharger 2. Moreover, the intercooler 34 is disposed below the supercharger 2. A blowby gas passage 38 connects a crank case of the engine with a part of an intake passage part 31a upstream of the supercharger 2 via a positive crankcase ventilation (PCV) valve 38b of differential pressure operation type (see FIG. 2). A blowby gas introduction part 38a of the blowby gas passage 38 to the intake passage part 31a is formed in an upper wall part of the intake passage part 31a upstream of the supercharger 2 and downstream of the throttle valve 33.

<Concrete Structure of Intake and Exhaust Systems of Engine>

Figure 3:
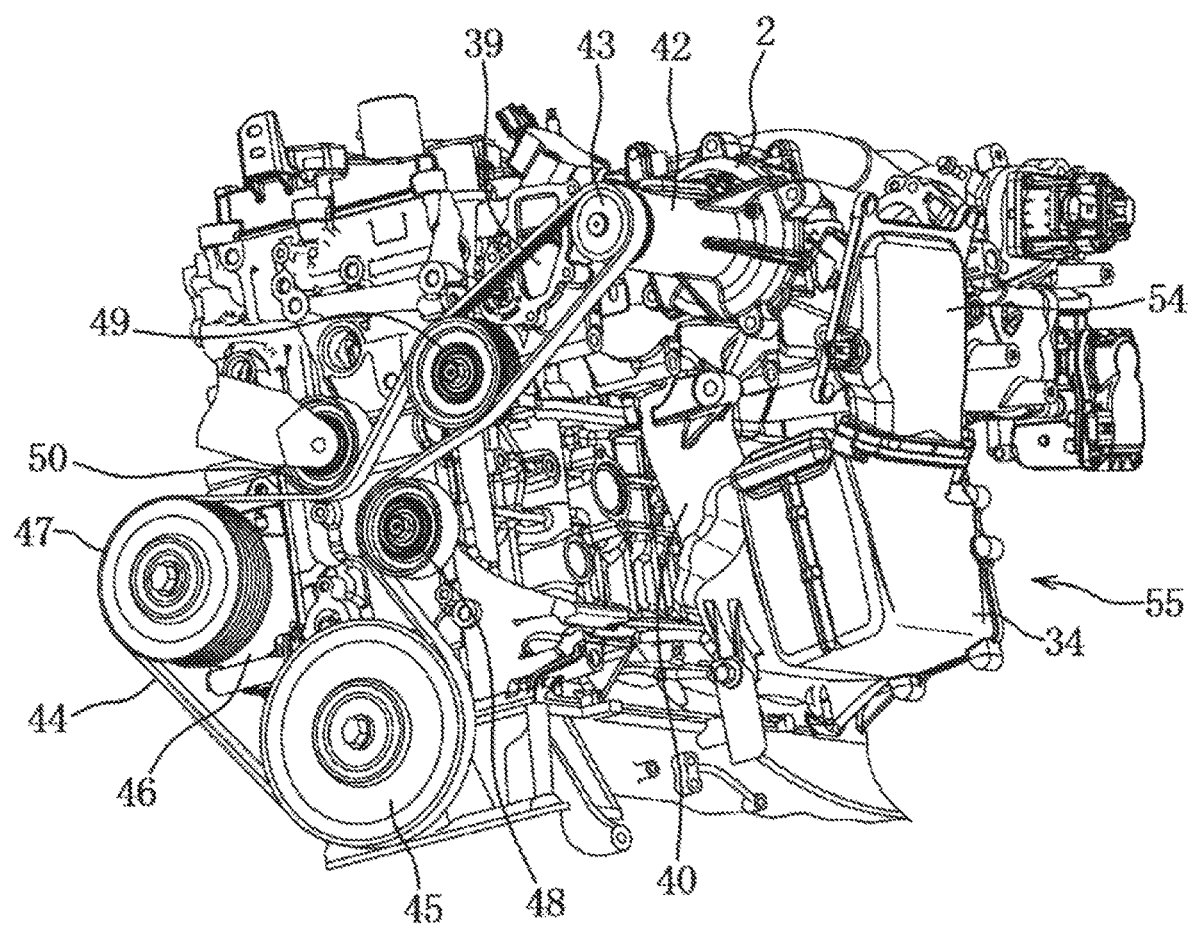
FIG. 3 is a perspective view of the engine.

This engine is a front intake and rear exhaust type, transverse engine in which lineup directions of the cylinders (in the longitudinal directions of the crankshaft) is oriented in vehicle width directions. The emission control device 36 has an oxidation catalyst and a particulate filter therein. As illustrated in FIG. 3, a surge tank 39 extends in the cylinder lineup directions along a side surface part of an engine body, and is connected to intake ports of the engine cylinders. An intake manifold includes the surge tank 39, and an intake air introduction pipe part 40 which is integrally formed with the surge tank 39, and is made of metal (in this embodiment, aluminum alloy). The intake air introduction pipe part 40 extends below the surge tank 39.

This engine is a four-cylinder engine having two intake ports for each cylinder. The intake manifold is provided with a total of eight branch intake passages (not illustrated) corresponding to the two intake ports of each cylinder. Each branch intake passage extends from the surge tank 39, and is fixed to the engine body at a part near the branch intake passage.

The supercharger 2 is a mechanical supercharger driven by an output shaft (crankshaft) of the engine as a power source, and a rotation shaft thereof is oriented in the cylinder lineup directions at a front and side part of the surge tank 39. As illustrated in FIG. 4, an upstream intake pipe 41 extending in the cylinder lineup directions is directly coupled to the supercharger 2. Intake air is introduced into the supercharger 2 from the upstream intake pipe 41. The upstream intake pipe 41 constitutes the intake passage part 31a of the intake passage 31 upstream of the supercharger 2.

A clutch housing 42 of the supercharger 2 projects to the opposite side of the upstream intake pipe 41 with respect to the supercharger 2. The electromagnetic clutch 3 (actuator) which drives the supercharger 2 by the engine output shaft is accommodated in the clutch housing 42. A transmission belt 44 is wound around a pulley 43 coupled to an input shaft of the electromagnetic clutch 3. The duty ratio of the electromagnetic clutch 3 is electrically controlled so that it is fully engaged at the duty ratio of 100% and is fully released at the duty ratio of 0%.

As illustrated in FIG. 3, the transmission belt 44 is wound around a crank pulley 45 coupled to the output shaft of the engine, and a pulley 47 coupled to a drive shaft of a water pump 46, in addition to the pulley 43 of the supercharger 2. Idlers 48 and 49 and a tension pulley 50 give a suitable tension to the transmission belt 44, and also give proper wrapping angles to the pulleys 43 and 47 of the supercharger 2 and the water pump 46, respectively.

A bypass pipe 51 which constitutes the bypass passage 35 is branched from the upstream intake pipe 41 which constitutes the intake passage part 31a upstream of the supercharger 2. As illustrated in FIG. 4, the bypass pipe 51 is branched from an upper surface of the upstream intake pipe 41 at a location downstream of the throttle valve 33 provided to the upstream intake pipe 41, and extends obliquely above the throttle valve 33. The bypass pipe 51 is folded from the part extending obliquely upward so as to be curved above the supercharger 2. The bypass pipe 51 extends in the cylinder lineup directions above the supercharger 2 toward the center of the surge tank 39, from a folded part 51a.

As illustrated in FIG. 2, the EGR passage 37 which recirculates exhaust gas to the intake system from the exhaust system is connected at a location downstream of the folded part 51a of the bypass pipe 51. The EGR passage 37 leads exhaust gas to the intake system from the location downstream of the particulate filter of the emission control device 36. An EGR cooler 52 which cools exhaust gas to be recirculated to the intake system is provided to an intermediate location of the EGR passage 37.

As illustrated in FIG. 4, an EGR valve 53 which controls a recirculating amount of exhaust gas is provided to the EGR gas introduction part 37a which is a connection of the EGR passage 37 to the bypass pipe 51. Moreover, the ABV 4 is provided to the bypass pipe 51 downstream of the EGR valve 53.

In this embodiment, a discharge pipe 54 for supercharging, the intercooler 34, and the intake air introduction pipe part 40 constitute a downstream intake pipe 55 which leads intake air to the surge tank 39 from the supercharger 2. As illustrated in FIG. 4, the downstream intake pipe 55 is formed in a U-shape where the intercooler 34 is disposed at a lowermost part thereof as a whole, when seen in the cylinder lineup directions.

In the intake and exhaust systems of the engine, when the supercharger 2 is not driven, intake air flows from the intake passage part 31a upstream of the supercharger 2 illustrated in FIG. 4 into the surge tank 39 through the bypass passage 35, and is then inhaled into the cylinder 30. When EGR gas is introduced into the intake passage 31 from the EGR gas introduction part 37a or blowby gas is introduced into the intake passage 31 from the blowby gas introduction part 38a, moisture contained in the EGR gas or the blowby gas is cooled and condensed on the wall surface of the intake passage 31 to produce condensate. This condensate flows from the bypass passage 35 upstream to the intake passage part 31a, and tends to be accumulated at the bottom of the intake passage part 31a. The produced condensate tends to enter into a gap of the supercharger 2, where it may be frozen when the engine is stopped and the ambient temperature is low.

Returning again to the description of the supercharging device 1, as illustrated in FIG. 1, the PCM 10 includes an inner wall temperature estimating module 11 which estimates an inner wall temperature of the supercharger 2, a determination module 12 which determines a freezing state of the supercharger 2, and a control module 13 which controls operations of the supercharger 2, the ABV 4, and the intake valve 6. The PCM 10 is comprised of a processor 14 (i.e., a CPU (Central Processing Unit)), a ROM, a RAM, an IN-side interface, and an OUT-side interface. The ROM stores program(s) and data for carrying out various controls, and the RAM stores a processing region used by the processor 14 executing a series of processings. The processor 14 is configured to execute the inner wall temperature estimating module 11, determination module 12, and the control module 13 to perform their respective functions. These modules are stored in the ROM.

First, the inner wall temperature estimating module 11 is described. The wall temperature estimating module 11 estimates a temperature increasing amount and a temperature decreasing amount of the supercharger 2, and then estimates the inner wall temperature of the supercharger 2 based on a difference between the estimated temperature increasing and decreasing amounts. The temperature increasing amount is calculated using a given equation based on parameters related to the supercharging state of the supercharger 2, such as the amount of intake air, the ambient temperature, the rotation speed of the supercharger 2, a pressure upstream of the supercharger 2, and a pressure downstream of the supercharger 2, which are detected by the sensors 23-27, respectively. Moreover, the temperature decreasing amount is calculated using the given equation based on parameters related to the cooling performance of the supercharger 2, such as the traveling speed and the grille shutter opening, which are detected by the sensors 28 and 29, respectively. Here, the grille shutter (not illustrated) is disposed in front of a radiator disposed in an engine bay of the vehicle, and opening and closing of the grille shutter is controlled according the traveling speed, etc. Since the amount of air introduced into the engine bay while the vehicle is traveling can be changed by adjusting the opening of the grille shutter, the temperature decreasing amount of the supercharger 2 also changes, and therefore, the grille shutter opening is reflected in the equation.

Next, the determination module 12 is described. When the condensate accumulated on the bottom of the intake passage part 31a enters into the supercharger 2 in a low-temperature state where the supercharger 2 is below the dew-point temperature, the condensate is frozen in the gap between the rotors and the casing. Then, when the engine operating state becomes in the supercharging range, the ice formed from the condensate is caught in the gap between the rotors and the casing, thereby impeding the rotation of the rotors. Therefore, the determination module 12 determines whether the inner wall temperature of the supercharger 2 estimated by inner wall temperature estimating module 11 is lower than a preset temperature (e.g., 0° C.). If the inner wall temperature of the supercharger 2 is lower than the preset temperature, it is determined to be a first freezing state where the condensate that entered the supercharger 2 is frozen.

Moreover, if the inner wall temperature of the supercharger 2 is lower than the dew point after an engine stop, the condensate on the inner wall of the supercharger 2 has already been frozen inside the supercharger. Then, while the condensate inside the supercharger 2 has already been frozen, if the supercharger 2 is driven, the ice may impede the rotation of the rotors. Therefore, the determination module 12 determines whether the rotation speed of the supercharger 2, in which a forcible drive for freezing determination (described later) is executed, is lower than a preset rotation speed. If the inner wall temperature of the supercharger 2 is lower than the preset temperature and the rotation speed of the supercharger 2 which has been forcibly driven is lower than the preset rotation speed, it is determined to be a second freezing state where the ice already exists inside the supercharger 2. Here, the forcible drive is to forcibly operate the supercharger 2 in the non-supercharging range.

As described above, the second freezing state can be considered to be a state where the possibility that the ice already exists inside the supercharger 2 is high, and the first freezing state can be considered to be a state where the possibility that the water that entered the supercharger 2 will freeze is high regardless of the existence of ice. Moreover, if it is determined to be the first freezing state, 1 is substituted in a first freezing state flag F1, and if it is determined to be the second freezing state, 1 is substituted in a second freezing state flag F2. Note that both the first and second freezing state flags F1 and F2 are 0 in their initial states.

Figure 5:
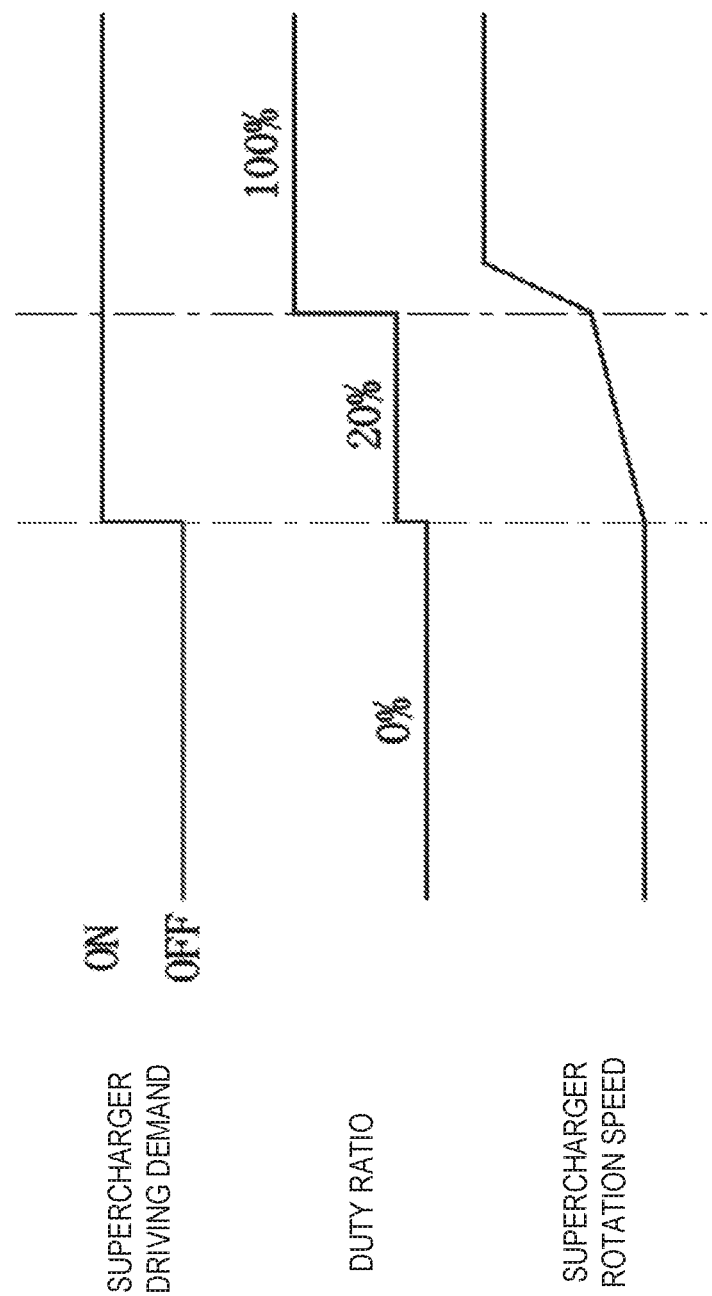
FIG. 5 is a timing chart illustrating an operational relation of a supercharger driving demand, a duty ratio, and a supercharger rotation speed.

Next, the control module 13 is described. The control module 13 has a supercharging range map where the supercharging range is set based on the engine speed and the engine load, and a target supercharging pressure map where a target supercharging pressure is set based on the engine operating state in the supercharging range (none of them is illustrated). The control module 13 sets a degree of engagement (duty ratio) and the opening of the ABV 4 based on the target supercharging pressure. The control module 13 then outputs instruction signals according to the set degree of engagement and opening of the ABV 4 to the electromagnetic clutch 3 and the drive unit 5, respectively. As illustrated in FIG. 5, if an amount of change in the duty ratio to be outputted to the electromagnetic clutch 3 is above a given value, for example, if shifting the duty ratio to 100% from 0%, the control module 13 is provided with a given control period at an intermediate duty ratio (e.g., 20%) in order to suppress a rapid change (engagement shock) of the rotation speed of the supercharger 2. During normal operation, the opening of the ABV 4 is smaller as the duty ratio of the electromagnetic clutch 3 becomes higher.

If it is determined to be the first freezing state by the determination module 12, the control module 13 executes, in the non-supercharging range, a forcible drive for increasing the inner wall temperature of the supercharger 2 and a retard control of the intake valve 6, in order to quickly increase the temperature of the inner wall temperature of the supercharger 2. The forcible drive for increasing the temperature is to fully engage the electromagnetic clutch 3 while closing the ABV 4, even if it is in the non-supercharging range where a demand for driving the supercharger does not exist. Thus, the temperature of the supercharger 2 is increased using compressed air which is increased in the temperature by the adiabatic compression.

Figure 6:
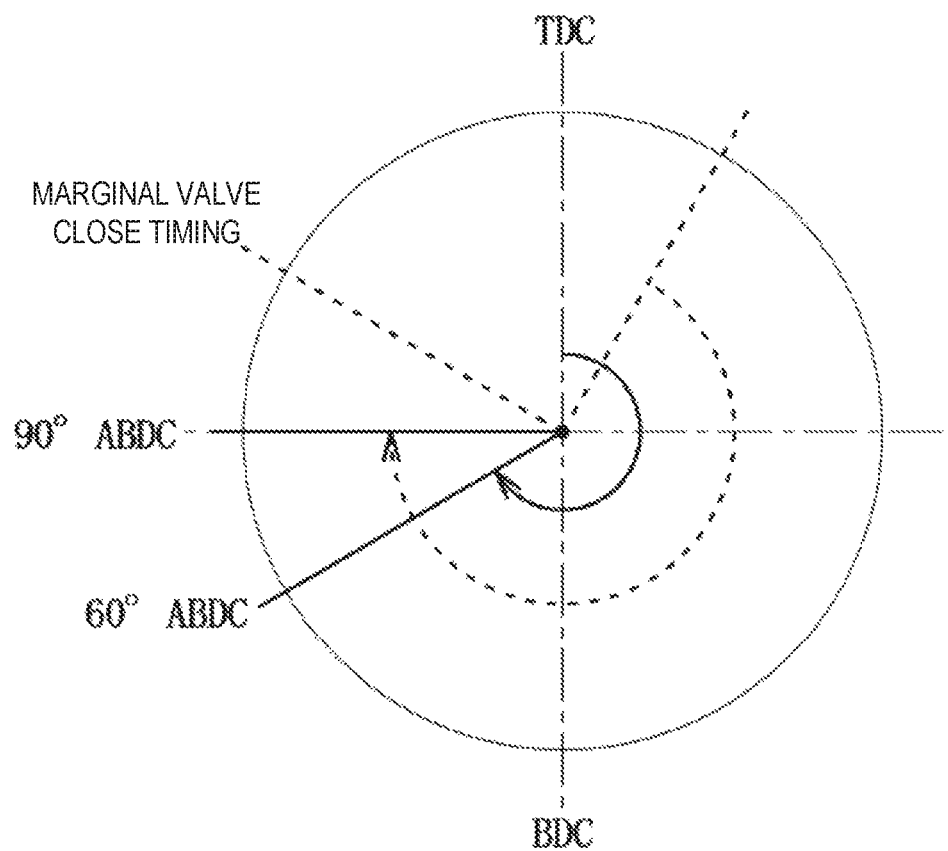
FIG. 6 is a diagram illustrating an intake valve timing.

If it is determined to be the first freezing state, the VVT 7 retards the open and close timings of the intake valve 6 by a given angle (e.g., 30 degrees). As illustrated in FIG. 6, during the normal operation, the intake valve 6 is set with basic open and close timings in which, according to the engine operating state, it is opened at a top dead center (TDC) and is closed at 60 degrees after a bottom dead center (BDC) (solid line).

In the case where it is determined to be the first freezing state, the control module 13 actuates the VVT 7 to change the open and close timings of the intake valve 6, from the open and close timings set according to the operating state of the engine to open and close timings retarded by a maximum retard amount which can guarantee at least the combustion performance, for example, by 30 degrees. For example, the open and close timings are changed so that the intake valve 6 is open at 30 degrees after a top dead center and is closed at 90 degrees after a bottom dead center (dashed line). Note that a marginal valve close timing of the intake valve 6 is 120 degrees after a bottom dead center. Thus, if it is determined to be the first freezing state, a blow-back through the bypass passage 35 of intake air warmed in the combustion chamber can be recirculated to the supercharger 2, thereby preventing the freezing of the condensate when entering into the supercharger 2. Note that since the VVT 7 uses known technology, detailed description is herein omitted.

Figure 7:
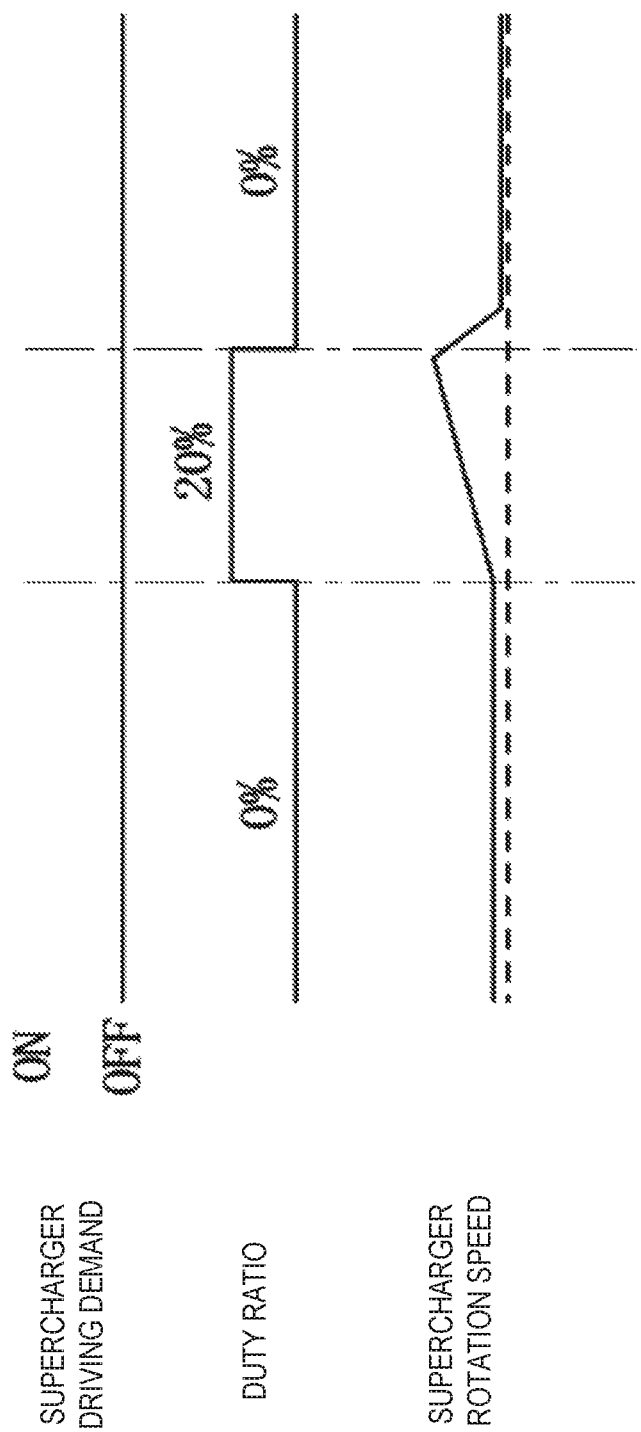
FIG. 7 is a timing chart illustrating an operational relation of a supercharger driving demand, a duty ratio, and a supercharger rotation speed, when the supercharger is forcibly driven for a freezing determination.

The control module 13 executes the forcible drive for freezing determination to determine the second freezing state, before executing the forcible drive for temperature increase. The forcible drive for freezing determination is to, for a given period, close the ABV 4 and imperfectly engage the electromagnetic clutch 3 (e.g., 20% of the duty ratio). As illustrated in FIG. 7, when the ice already exists inside the supercharger 2 after the imperfect engagement of the electromagnetic clutch 3, there is no change in the rotation speed of the supercharger 2 (dashed line), and when the ice does not exist inside the supercharger 2, the rotation speed of the supercharger 2 increases slightly (solid line). Thus, the electromagnetic clutch 3 can be engaged in a half-clutch state, and the second freezing state can be determined, without causing the difficulties, such as the seizure of the transmission belt 44, even if the ice already exists. Moreover, if it is determined to be the second freezing state, the ABV 4 is opened and the electromagnetic clutch 3 is fully released or disengaged until the temperature increase of the supercharger 2 is completed.

That is, if it is determined to be the second freezing state, the control module 13 prohibits the forcible drive for temperature increase, and opens the ABV 4 and turns off the electromagnetic clutch 3 until the temperature of the supercharger 2 is increased. Moreover, if it is only determined to be the first freezing state without determining to be the second freezing state, the control module 13 closes the ABV 4 and turns on the electromagnetic clutch 3 to execute the forcible drive for temperature increase. Thus, the supercharger 2 can be quickly warmed up, without causing the difficulties, such as the seizure of the transmission belt 44.

Figure 8:
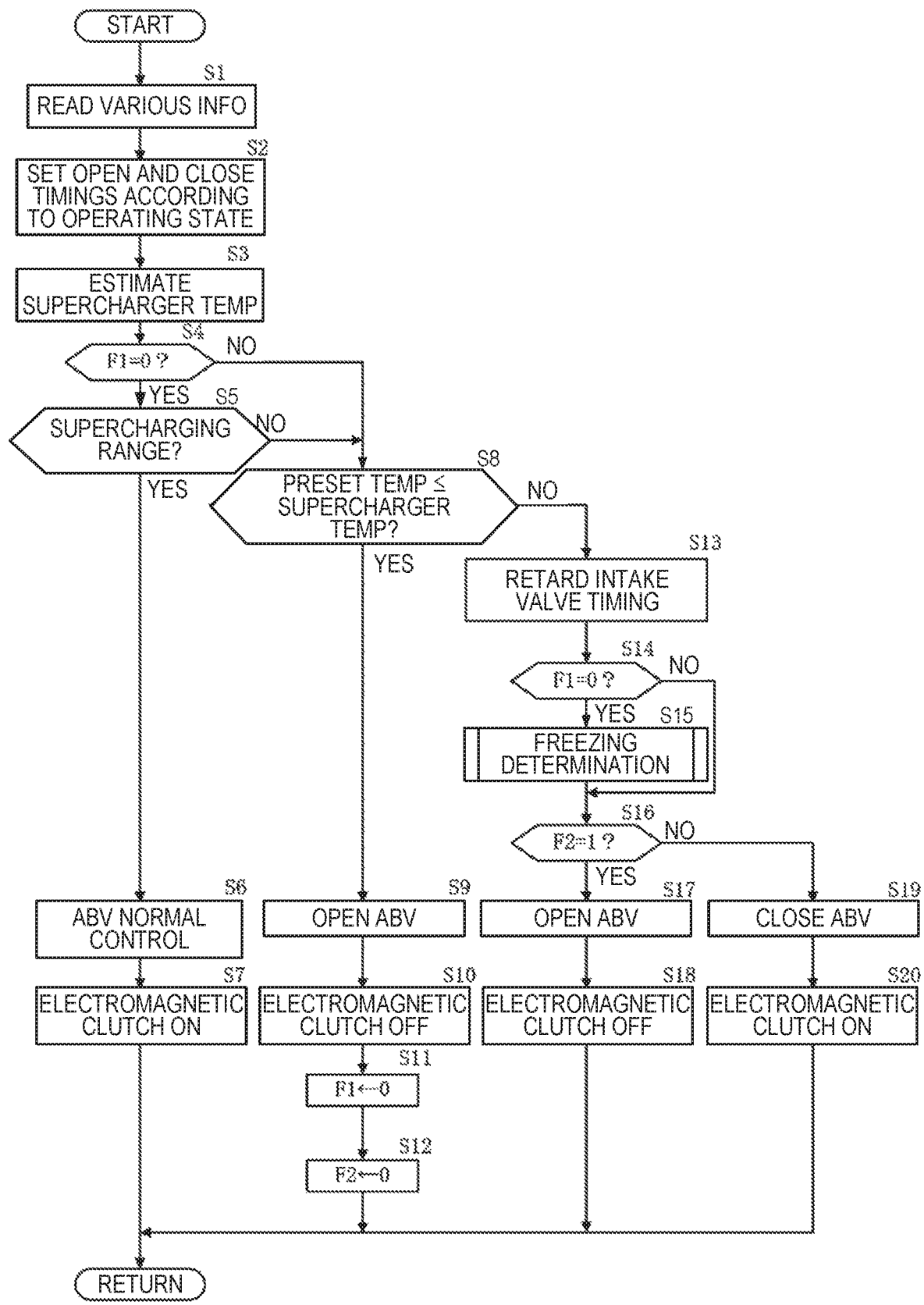
FIG. 8 is a flowchart illustrating a supercharging control.

Next, a supercharging control is described based on a flowchart of FIG. 8. Note that Si (i=1, 2, . . . ) indicates a step for each processing.

First, the control module 13 reads various information, such as the output signals from the sensors 21-29 at S1. Next, according to the engine operating state, the control module 13 sets the open and close timings of the intake valve 6 (S2), and estimates the inner wall temperature of the supercharger 2 based on the outputs of the sensors 21-29 (S3). At S4, the control module 13 determines whether the first freezing state flag F1 is 0. If the first freezing state flag F1 is 0 as a result of the determination of S4, the control module 13 shifts to S5, because it is not determined to be the first freezing state. At S5, the control module 13 determines whether the engine operating state is in the supercharging range. If the operating state is in the supercharging range as a result of the determination of S5, the control module 13 carries out the normal control of the opening of the ABV 4 according to the target supercharging pressure (S6), carries out the complete engagement control of the electromagnetic clutch 3 (S7), and then returns to S1.

If the first freezing state flag F1 is not 0 as a result of the determination of S4, or if the engine operating state is not in the supercharging range as a result of the determination of S5, the control module 13 shifts to S8. At S8, the control module 13 determines whether the estimated inner wall temperature of the supercharger 2 is higher than the preset temperature. If the inner wall temperature of the supercharger 2 is higher than the preset temperature as a result of the determination of S8, the control module 13 opens the ABV 4 (S9) and fully releases the electromagnetic clutch 3 (S10), because the temperature of the supercharger 2 is high. Next, the control module 13 sets the first freezing state flag F1 to 0 and the second freezing state flag F2 to 0 (S11, S12), and then returns to S1.

If the inner wall temperature of the supercharger 2 is lower than the preset temperature as a result of the determination of S8, the control module 13 retards the valve timing of the intake valve 6 by the maximum retard amount which can guarantee at least the combustion performance (e.g., 30 degrees) (S13), because the supercharger 2 is at least in the first freezing state, and then shifts to S14. At S14, the control module 13 determines whether the first freezing state flag F1 is 0. If the first freezing state flag F1 is 0 as a result of the determination of S14, the control module 13 shifts to S15, because the freezing determination has not yet been carried out, where the freezing determination is carried out.

Next, at S16, the control module 13 determines whether the second freezing state flag F2 is 1. If the second freezing state flag F2 is 1 as a result of the determination of S16, the control module 13 opens the ABV 4 (S17) and fully releases the electromagnetic clutch 3 (S18), because the ice already exists inside the supercharger 2, and then returns to S1. If the second freezing state flag F2 is not 1 as a result of the determination of S16, the control module 13 executes the forcible drive for temperature increase in which the ABV 4 is closed and the electromagnetic clutch 3 is fully engaged (S19, S20), since the ice does not exist inside the supercharger 2, and then return to S1.

Figure 9:
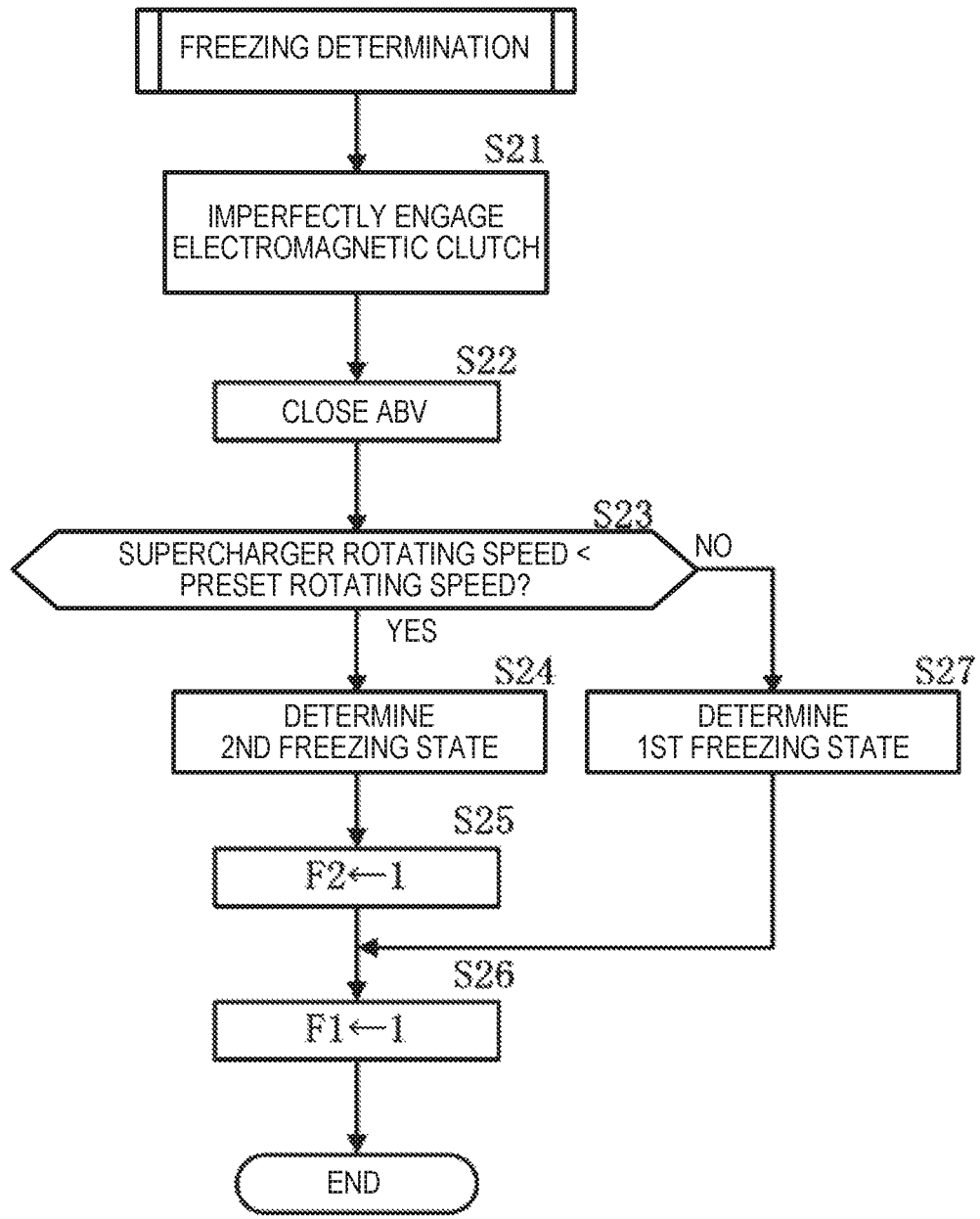
FIG. 9 is a flowchart illustrating a freezing determination.

Next, the freezing determination of S15 is described. As illustrated in the flowchart of FIG. 9, in the freezing determination, first at S21, the control module 13 imperfectly engages the electromagnetic clutch 3 (20% of the duty ratio) and closes the ABV 4 (S22), and then shifts to S23.

At S23, the control module 13 determines whether the rotation speed of the supercharger 2 is below the preset rotation speed. If the rotation speed of the supercharger 2 is below the preset rotation speed as a result of the determination of S23, the control module 13 determines it as the second freezing state (S24), because the ice already exists inside the supercharger 2. At S25, the control module 13 substitutes 1 in the second freezing state flag F2, and then shifts to S26. At S26, the control module 13 substitutes 1 in the first freezing state flag F1, and then returns to S21. If the rotation speed of the supercharger 2 is above the preset rotation speed as a result of the determination of S23, the control module 13 shifts to S26 without determining the second freezing state, because the ice does not exist inside the supercharger 2.

Next, operation and effects of the supercharging device 1 are described. According to the supercharging device 1 of this embodiment, since the PCM 10 forcibly drives the supercharger 2 to increase the temperature through the electromagnetic clutch 3 (engine output shaft) in the non-supercharging range when the temperature associated with the supercharger 2 is lower than the preset temperature (first freezing state), the temperature of the supercharger 2 can be increased before the operating state becomes in the supercharging range, thereby avoiding the freezing in the supercharger 2 and securing a traveling performance expected of the supercharger 2. Moreover, since the PCM 10 prohibits the forcible drive for temperature increase of the supercharger 2 if the occurrence of freezing in the supercharger 2 is determined based on the state of the supercharger 2 while the supercharger is forcibly driven for the freezing determination (second freezing state), the difficulties resulting from the ice which already exists in the supercharger 2 can be avoided.

Moreover, since the actuator of the supercharger 2 has the electromagnetic clutch 3 which engages the engine output shaft with the supercharger 2, and when the temperature of the supercharger 2 is lower than the preset temperature, the PCM 10 reduces the duty ratio which is the degree of engagement of the electromagnetic clutch 3 and forcibly drives the supercharger 2 for the freezing determination, the difficulties, such as the ice bite can be reduced, even if the ice already exists in the supercharger 2.

The actuator of the supercharger 2 includes the electromagnetic clutch 3 which engages the engine output shaft with the supercharger 2, the bypass passage 35 which bypasses the supercharger 2, and the ABV 4 which opens and closes the bypass passage 35. The PCM 10 forcibly drives the supercharger 2 for the temperature increase by releasing the electromagnetic clutch 3 and opening the ABV 4 when the engine operating state is in the non-supercharging range, and by closing the ABV 4 in the non-supercharging range when the temperature of the supercharger 2 is lower than the preset temperature. Thus, since the PCM 10 opens the electromagnetic clutch 3 and opens the ABV 4 when the engine operating state is in the non-supercharging range, intake air can be supplied while reducing a channel resistance when the operating state is in the non-supercharging range. Moreover, since the PCM 10 forcibly drives the supercharger 2 for the temperature increase by closing the ABV 4 in the non-supercharging range when the temperature of the supercharger 2 is lower than the preset temperature, the temperature of the supercharger can be increased, before the engine operating state enters the supercharging range.

Since the PCM 10 determines the freezing based on the rotation speed of the supercharger 2 when the supercharger 2 is forcibly driven for the freezing determination, it can easily determine the ice which already exists in the supercharger 2.

Since the PCM 10 engages the electromagnetic clutch 3 and closes the ABV 4 when forcibly driving the supercharger 2 for the temperature increase, it can quickly increase the temperature of the supercharger 2.

Since the PCM 10 estimates the temperature of the supercharger 2 based on the parameters related to the supercharging state of the supercharger 2 and the parameters related to the cooling performance of the supercharger 2, it can easily estimate the inner wall temperature of the supercharger 2.

Next, several modifications in which the previous embodiment is partially changed will be described.

(Modification 1)

Figure 10:
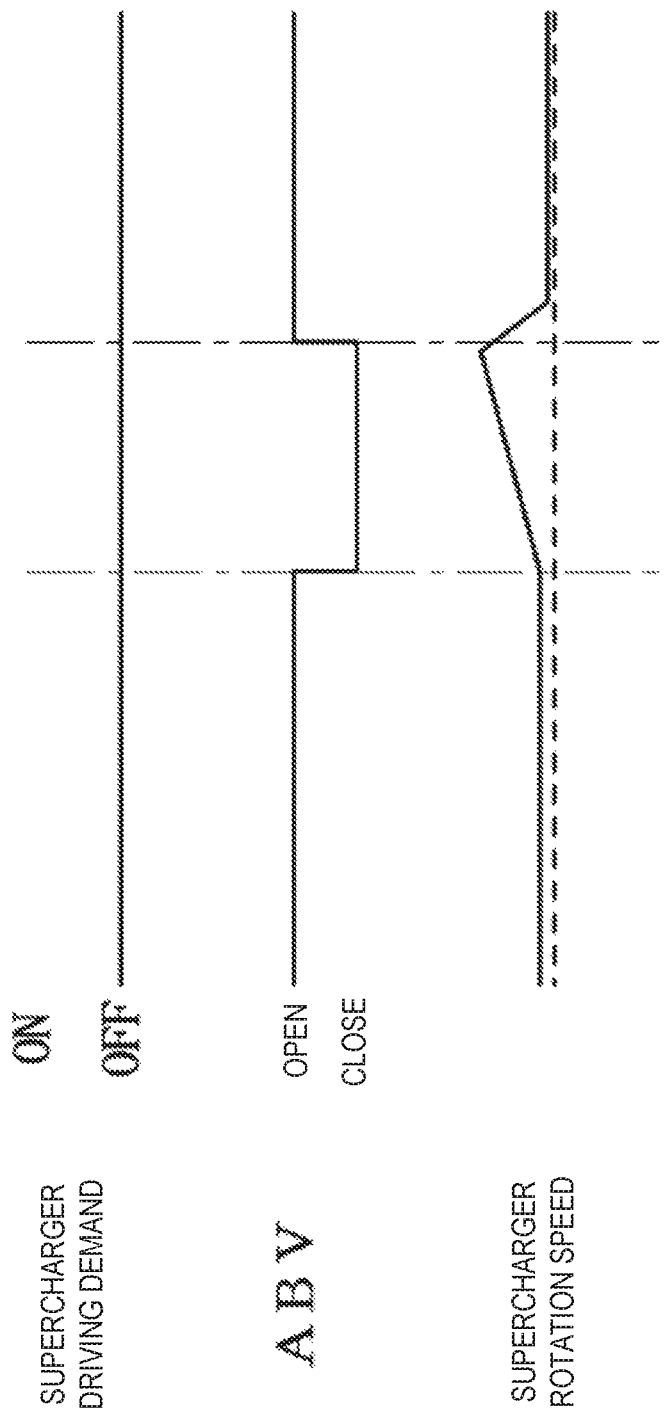
FIG. 10 is a timing chart illustrating an operational relation of a supercharger driving demand, a bypass valve (ABV), and a supercharger rotation speed when the supercharger is forcibly driven for the freezing determination, according to one modification.

Although in the previous embodiment the example where the electromagnetic clutch is imperfectly engaged (20% of the duty ratio) and the ABV is closed when the supercharger is forcibly driven for the freezing determination to determine the second freezing state is described, the duty ratio may be higher or lower than 20%. Moreover, when the drive resistance of the supercharger is small, it may be forcibly driven for the freezing determination while the electromagnetic clutch is fully released and the ABV is closed. As illustrated in FIG. 10, when the ice exists inside the supercharger after the electromagnetic clutch is fully released and the ABV is closed, the rotation speed of the supercharger does not change (dashed line), and when the ice does not exist inside the supercharger, the rotation speed of the supercharger increases slightly (solid line). The second freezing state may be determined based on the rotation speed of the supercharger in the forcible drive for freezing determination. Thus, the supercharger may be driven slowly accompanying the engine air intake, and therefore, it can reduce the difficulties, such as the ice bite, even if the ice already exists inside the supercharger.

(Modification 2)

Although in the previous embodiment the example where the open and close timings of the intake valve are retarded by the maximum retard amount which can guarantee at least the combustion performance when the first freezing state is determined is described, the open and close timings of the intake valves may be retarded according to the temperature of the supercharger. For example, the open and close timings of the intake valves are retarded as the temperature of the supercharger decreases. Thus, an excessive retard can be prevented, and both the temperature increase of the supercharger and the combustion performance can be achieved. Moreover, the present disclosure is configured at least to retard the valve close timing of the intake valve, and therefore a change in the valve open timing may be prohibited.

(Modification 3)

Although in the previous embodiment the example where the supercharger temperature is estimated based on the parameters related to the supercharging state of the supercharger and the parameters related to the cooling performance of the supercharger, and the parameters related to the supercharging state are the amount of intake air, the ambient temperature, the rotation speed of the supercharger, the pressure upstream of the supercharger, and the pressure downstream of the supercharger is described, at least one of the five parameters may be used. Moreover, the temperature increasing amount may be estimated based on a combination of at least one of the five parameters and parameters other than the five parameters. Similarly, although the example where the parameters related to the cooling performance of the supercharger are the traveling speed and the opening of the grille shutter is described, one of the two parameters may be used. Moreover, the temperature decreasing amount may be estimated based on a combination of one of the two parameters and parameter(s) other than the two parameters.

(Modification 4)

Although in the previous embodiment the example where the supercharger is of the Lysholm type is described, the present disclosure is not to limited to the mechanical supercharger but may also be applied to any types of superchargers, such as an electrically-driven supercharger which drives a blower by an electric motor, and a turbocharger.

Those skilled in the art may implement the present disclosure in other forms in which the above embodiment is changed variously, without departing from the subject matter of the present disclosure. The present disclosure also includes such changes. It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Supercharging Device
2 Supercharger

3 Electromagnetic Clutch
4 ABV
10 PCM
35 Bypass Passage

What is claimed is:

1. A supercharging device for an engine, comprising:
a supercharger provided to an intake passage of the engine;
an actuator configured to drive the supercharger; and
a controller including a processor configured to control the actuator to drive the supercharger when an operating state of the engine is in a given supercharging range, and to stop the supercharger when the operating state of the engine is in a non-supercharging range, wherein
the actuator includes an electromagnetic clutch configured to engage an output shaft of the engine with the supercharger, a bypass passage bypassing the supercharger, and a valve configured to open and close the bypass passage;
the controller is configured to release the electromagnetic clutch and open the valve when the operating state is in the non-supercharging range;
the controller is configured to forcibly drive the supercharger by closing the valve in the non-supercharging range when a temperature of the supercharger is lower than a preset temperature;
the controller is configured to cause the actuator to forcibly drive the supercharger in the non-supercharging range when the temperature of the supercharger is lower than the preset temperature;
the controller is configured to engage the electromagnetic clutch and close the valve when forcibly driving the supercharger;
the controller is configured to determine whether a rotation speed of the supercharger is lower than a preset rotation speed; and
the controller is configured to prohibit the forcible drive of the supercharger when a rotation speed of the supercharger during the forcible drive of the supercharger is lower than the preset rotation speed.

2. The supercharging device of claim 1,
wherein the controller is configured to forcibly drive the supercharger by reducing a degree of engagement of the electromagnetic clutch when the temperature of the supercharger is lower than the preset temperature.

3. The supercharging device of claim 1, wherein the controller is configured to estimate an increasing amount and a decreasing amount of the temperature of the supercharger, and estimate the temperature of the supercharger based on a difference between the estimated increasing and decreasing amounts of the temperature.

4. The supercharging device of claim 3, wherein the controller is configured to estimate the increasing amount of the temperature based on at least one of an amount of intake air, an ambient temperature, the rotation speed of the supercharger, a pressure upstream of the supercharger, and a pressure downstream of the supercharger.

5. The supercharging device of claim 3, wherein the controller is configured to estimate the decreasing amount of the temperature based on a traveling speed of a vehicle.

* * * * *